(12) United States Patent
Boin

(10) Patent No.: US 8,423,324 B2
(45) Date of Patent: Apr. 16, 2013

(54) PROCESS AND DEVICE FOR PASSENGER CABIN LAYOUT

(75) Inventor: Jean Philippe Boin, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 409 days.

(21) Appl. No.: 12/830,707

(22) Filed: Jul. 6, 2010

(65) Prior Publication Data

US 2011/0010135 A1    Jan. 13, 2011

(30) Foreign Application Priority Data

Jul. 8, 2009   (FR) ..................................... 09 54719

(51) Int. Cl.
*G06F 17/50*   (2006.01)
(52) U.S. Cl.
USPC ........................................... 703/1; 244/118.6
(58) Field of Classification Search ..................... 703/1
See application file for complete search history.

(56) References Cited

U.S. PATENT DOCUMENTS

| | | | |
|---|---|---|---|
| 4,856,738 A | 8/1989 | Martin | |
| 5,611,503 A * | 3/1997 | Brauer | 244/118.6 |
| 6,467,728 B2 | 10/2002 | Angerami et al. | |
| 6,507,309 B2 * | 1/2003 | McMakin et al. | 342/22 |
| 6,968,298 B2 * | 11/2005 | Lohmann et al. | 703/1 |
| 7,232,094 B2 | 6/2007 | Bishop et al. | |
| 7,252,268 B2 | 8/2007 | Saint-Jalmes | |
| 8,138,888 B2 * | 3/2012 | Mukherjee | 340/5.82 |
| 2008/0228358 A1 * | 9/2008 | Wang et al. | 701/49 |

FOREIGN PATENT DOCUMENTS

| | | |
|---|---|---|
| DE | 10 2007 052 598 | 5/2008 |
| EP | 0 282 244 | 9/1988 |
| EP | 1 127 788 | 8/2001 |
| EP | 1 314 643 | 5/2003 |
| FR | 2 843 730 | 2/2004 |
| WO | 03/074357 | 9/2003 |
| WO | 2009/095306 | 8/2009 |
| WO | 2009/095307 | 8/2009 |

OTHER PUBLICATIONS

Nadadur et al, "Using Designing for Human Variability to Optimize Aircraft Seat Layout", Digital Human Modeling for Design and Engineering Conference and Exhibition, Jun. 9, 2009, Gothenburg, Sweden, Published Jun. 9, 2009.*
Wager et al, "Optimization of Experimental Design in fMRI: A General Framework Using a Genetic Algorithm", NeuroImage 18, pp. 293-309, 2003.*
Howells, David ("Enhancing Air Travel Experience", Aircraft Engineering and Aerospace Technology, 2004, 76, 1.*

* cited by examiner

*Primary Examiner* — Mary C Jacob
(74) *Attorney, Agent, or Firm* — Young & Thompson

(57) ABSTRACT

A process for determining the distribution of seats of a passenger cabin, whereby the cabin includes at least one row of seats arranged essentially one behind the other along a longitudinal axis, and the cabin includes element for arranging each seat in a position on the ground among a set of possible positions spaced longitudinally at known intervals, includes a phase for optimization of the spacing of seats according to an overall comfort function of passengers, taking into account bodily characteristics that are specific to at least some of the passengers, including the length of the front segment of the passengers' legs, and the purpose of the optimization is to maximize a comfort function taking into account in particular the space that is free for each passenger between his knees and the seat that is located in front of him. The purpose of the invention is also the related device.

21 Claims, 1 Drawing Sheet

PROCESS AND DEVICE FOR PASSENGER CABIN LAYOUT

BACKGROUND OF THE INVENTION

This invention pertains to the field of passenger transport. It relates more particularly to the interior layout of cabins designed to accommodate passengers and even more specifically to the determination of an optimal arrangement of seats in this cabin.

DESCRIPTION OF THE RELATED ART

Context Of The Invention And Problems Posed

In these passenger cabins of transport vehicles, for example aircraft, it is standard practice to use rows of seats, essentially aligned longitudinally, arranged one behind the other, with access to groups of adjacent seats being provided from one or more longitudinal aisles.

Such an arrangement is due, i.a., to a maximization of the occupation of the space and to safety constraints during longitudinal accelerations of the aircraft.

The layout of seats in a passenger transport vehicle poses technical problems linked to two opposite requirements that are, on the one hand, the optimization of the occupation of the cabin, and, on the other hand, the passenger's need for comfort and freedom of movement.

On the one hand, the number of seats is to be maximized to improve the overall profitability of the carrier. On the other hand, the passengers have the right to require a comfort level that is suitable for their stay in the aircraft. It is known, furthermore, that various physiological problems are due to a situation of prolonged seating in a cramped position. These problems can lead to significant health problems, which diminish the carrier's image over the long term.

Various methods for managing the layout of the passenger transport cabin have been considered and developed over time:

A first method is the distribution of passengers into classes: In this case, the seat layout is typically done in several classes offering different levels of service in terms of passenger comfort.

However, this class distribution does not make it possible to increase the passenger comfort with a constant seat number. Consequently, in the higher classes, the reduced number of seats is compensated for by a rate increase on these classes.

Another known method is the use of adjustable seat positions. Within this field, various processes, such as are described in, for example, the patent documents U.S. Pat. No. 4,856,738 A and EP 282 244 A1 (British Aerospace 1988), are known.

In these documents, as in all of the recent methods for passenger cabin layout, the seats are attached to longitudinal horizontal rails, themselves attached to the floor of the cabin, and they comprise a set of attachment points distributed at regular intervals, for example on the order of several centimeters, thereby making possible great flexibility within the selection of a separation distance between two rows of seats.

The adjustment of the seat position certainly makes possible a greater flexibility within the layout. Based on the type of path and the occupation level, each company can optimize its layout a priori.

In the patent document EP 282 244, each seat or seat row is equipped with an adjustable device that makes it possible to move it and to reposition it along a slide. The adjustment can be done either by the company that operates the transport before departure or by the passenger himself during the journey.

These devices can be maneuvered just before departure or during the journey by the passenger himself. This technique makes it possible to increase the space between the seats locally but at the expense of another location, and the overall comfort of the passengers is not improved. It also poses safety problems if the device is not used correctly.

Various unconventional passenger cabin layouts are also known. The simplest layout is actually to arrange the seats in rows in all the same direction, whereby the rows overall are perpendicular to the traffic aisles.

However, it is also possible to offset each line of seats relative to the line facing it, which makes it possible to improve the lateral comfort between each seat. Such an arrangement is cited in, for example, the patent document EP 1 314 643 B1 (Airbus GmbH, 2001).

Certain layouts likewise propose a back-to-back seat arrangement adapted to aircraft cabins (patent FR 2 843 730 A1, Airbus 2002) or else arrangements of passengers placed upright (patent EP 1 127 788 B1, Airbus GmbH, 2000).

Unconventional layouts improve passenger comfort but greatly reduce the overall transport capacity of the aircraft. In addition, it becomes difficult to include relaxation devices such as video systems in such layouts. This type of layout, furthermore, is static and does not address mass transport.

Offset layouts do not allow the increase of longitudinal space between each seat and can create a sensation of confinement.

The vertical layout poses problems of passenger comfort and fatigue and is not suitable for long travel times.

It is understood that all of these processes for managing a passenger cabin layout propose imperfect solutions to justified but contradictory constraints that are imposed by both carriers and passengers.

Objectives Of The Invention

The objective of the invention is to automatically adapt the arrangement of seats such that each passenger, regardless of his size, may have the same longitudinal comfort level without the number of seats being reduced.

DISCLOSURE OF THE INVENTION

For this purpose, the object of the invention is a process for determining the distribution of seats of a passenger cabin, whereby said cabin comprises at least one row of seats arranged essentially one behind the other along a longitudinal axis, whereby said cabin comprises means for arranging each seat in a position on the ground among a set of possible positions spaced longitudinally at known intervals, whereby said process comprises a phase for optimization of the spacing of seats according to an overall comfort function of passengers, taking into account characteristics that are specific to at least some of said passengers.

According to an advantageous implementation, the specific characteristics comprise bodily parameters that are linked to the length of the front segments of the passengers' legs.

According to a particular implementation of the process, it comprises phases of:

Acquiring bodily parameters of at least some of the passengers before passengers enter the cabin, Calculating the optimization of space between the seats and assigning seats to passengers, optimized based in particular on the bodily parameters of the passengers, Moving at least some seats according to the results of this calculation of optimization.

According to various implementations of the process optionally used together:

The acquisition of the bodily parameters of the passengers is done by the recovery of the data stored in a member's discount card, The acquisition of the bodily parameters of the passengers comprises a stage of acquisition of at least one image of the passenger, and one stage of implementing an automatic visual recognition algorithm of bodily segments in these images.

According to an advantageous implementation, the calculation of optimization of spacing between seats and the assignment of seats to passengers uses an optimization algorithm under constraints.

In this case, in a more particular implementation, the optimization algorithm uses, as a function to be optimized, an overall function of passenger comfort, determined in particular by the space left free in front of the passengers' knees.

Even more particularly, the overall function of layout comfort is the sum of the comfort functions of all of the passengers: the "comfort" of one passenger is zero when the distance between the seat in front of him and his knees is negative or zero and increases quickly with the available space in front of his knees, reaching a limit beyond a certain preselected space.

It is understood that the process according to the invention automatically adapts to the size of each passenger to offer him a constant space between his knees and the seat in front in a conventional layout configuration (FIG. 1).

It is recalled that in a distribution of passengers into classes, a larger-than-average passenger should pay more for an equivalent comfort level. This is naturally no longer the case in this invention.

Likewise, the modulation of the space between the seats by devices that are accessible to the passengers themselves during flight only shifts the problem from one passenger to the next and does not truly solve the layout problem.

The layout a priori by the conveyor for accommodating a predetermined number of passengers does not take into account the special features of each passenger and consequently cannot be adapted.

Relative to the proposed solutions, this process is adapted individually to each passenger. The calculation of the optimum layout by taking into account a large number of constraints cannot be resolved manually. The process relies on a computer algorithm for optimization under the constraint that will find the layout such that the space between the knees and the seat in front is the same throughout regardless of the passenger's size. Relative to other existing processes, the invention thus ensures an overall increase in the comfort level for the same number of seats. In the worst case, if the algorithm does not find the optimum, the layout remains as is and is not degraded.

The movement of seats is carried out automatically. It does not require particular intervention and can ensure a higher safety level than a manual system.

The purpose of the invention is also a device for laying out a passenger cabin, whereby said cabin comprises at least one row of seats that are arranged essentially behind one another along a longitudinal axis, and means for arranging each seat in a position on the ground among a set of possible positions spaced longitudinally at known intervals, whereby said device comprises:

Means for acquiring bodily parameters of at least some of the passengers before they enter the cabin, Means for calculating the optimization of space between the seats and for assigning seats to passengers, optimized based in particular on the bodily parameters of the passengers, Means for automatic longitudinal movement of at least certain seats according to the results of this calculation of optimization, whereby these means comprise motorization means of the seats, and remote control means of these motorization means.

The purpose of the invention is also a computer program product that comprises a set of code instructions that can implement a process as disclosed when these instructions are executed on a computer.

BRIEF DESCRIPTION OF THE FIGURES

The following description, provided only by way of example of an embodiment of the invention, is given by referring to the accompanying figures in which.

DETAILED DESCRIPTION OF AN EMBODIMENT OF THE INVENTION

The invention is designed to be implemented within the framework of a room with predetermined dimensions that is suitable for accommodating individuals in a seated position for a certain period (in general several hours). This is the case in particular of a passenger cabin of a transport vehicle, for example an aircraft cabin with a very elongated, essentially rectangular floor.

Hereinafter, a longitudinal axis X is defined as essentially identical to the longitudinal axis of the cabin and in general oriented parallel to the axis of displacement of the vehicle.

Hereinafter, but in a not at all limiting manner, such a cabin is presumed to be equipped with means for attaching seats, for example in the form of rails that have attachment points distributed every several centimeters. In this way, each seat can be arranged in a large number of different longitudinal positions according to the layout that is selected.

The technical characteristics of the floor of the cabin, seats or means for attaching the seats to the floor that are presented in detail are presumably known to one skilled in the art and emerge from the framework of this invention. They are therefore not presented in any further detail here.

The invention comprises a process that can be implemented in computer form, executed on a computer of the type that is known in the art. Such a computer can be of the commercial micro-computer type ("PC") that is dedicated to the process and equipped with conventional interfaces and recording means.

It may advantageously involve a preexisting computer within an airline that implements the process for the management of the layouts of the passenger cabins of its aircraft.

Figure 1:
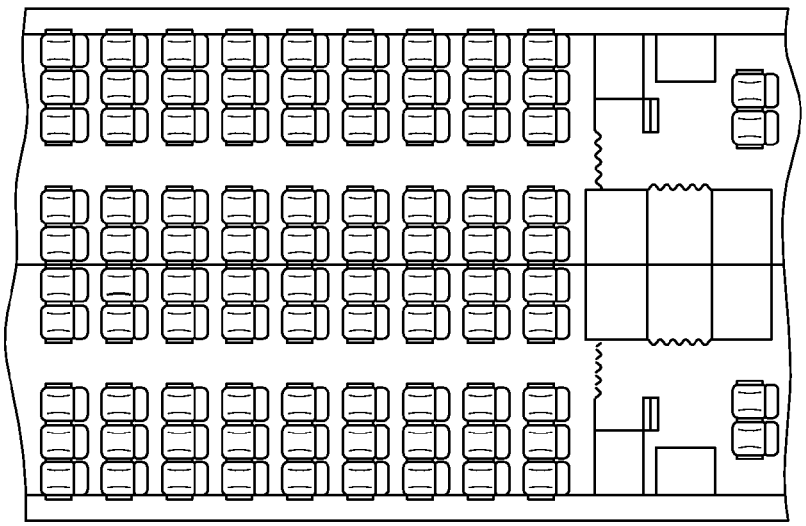
FIG. 1, already cited, illustrates in top view a distribution of the seats according to the prior art.
Figure 2:
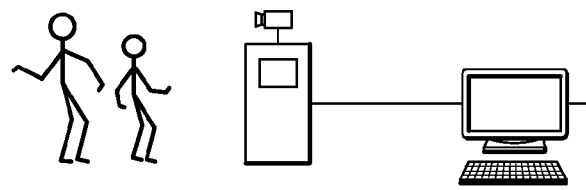
FIG. 2 illustrates the elements that are involved in the implementation of the process.

In this case (illustrated by FIG. 2), this computer is presumably equipped with network interfaces that are suitable for allowing it to receive data from a set of passenger registration stations, themselves equipped with computer means. Each of these registration stations further comprises means for acquiring size measurements of the passengers when the latter register. These means may simply consist of a key, whereby an operator asks the passenger his size and enters it into his computer by the key. It may also involve automatic image acquisition means with recognition of biometric parameters, in particular size and length of legs.

In still another variant, the biometric data can be recorded on a traveler's discount card issued by the airline, data entry being done in a totally transparent way for the passenger when he presents his discount card during the registration for his flight.

It is understood that what has been conveyed to a human operator can also be produced automatically by a registration terminal, whether this is by asking the passenger a question regarding his size, by reading data on his possible discount card, or by acquiring real time information on his size by optical means, etc.

These different means are also known per se, and the details of their operation are therefore not described here.

The computer is also presumably equipped with a network interface that can issue seat movement data to a terminal that can be accessed by a cabin layout worker so as to convey to the latter the layout to be implemented. Advantageously, the computer directly controls the longitudinal movement of seats to calculated positions. Such an arrangement naturally can be considered only for aircraft that are equipped with seats whose longitudinal positions are subject to motorization means that can be controlled remotely. Hereinafter, this is presumably the case in this implementation of the process.

It should be noted that a device that comprises, on the one hand, endless screws integrated with slides (support rails) of the seats, and, on the other hand, small electric motors integrated with the seats can perform the required function. These electric motors can be of the stepper type or another device that is known to one skilled in the art. The electric motors are then controlled by an electronic control unit of the type that is also known, interfaced with the computer for calculating the layout.

The displacement speeds of the seats along the slides do not need to be high (on the order of several centimeters to several tens of centimeters per minute). In contrast, the moving system is to be sized to meet the same safety requirements as a stationary attachment system.

The layout of seats in the cabin is not a priori designed to be modified during flight. Thus, the supply of the system can be obtained from the aircraft or even from the ground and will not disadvantage the energy consumption balance sheet of the aircraft in flight. The movement phase of the seats takes only a few minutes and can be carried out at the same time as other operations before boarding (refueling, loading luggage, etc.).

Figure 3:
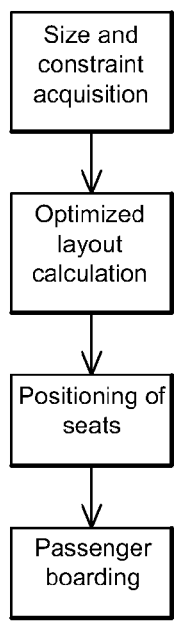
FIG. 3 is a flow chart of the stages of the process.

The implementation of the layout process of the passenger cabin comprises several phases that are carried out before the passengers enter the cabin (see FIG. 3):

1) Acquisition of the size of each passenger before the passengers enter the cabin.

2) Calculation of the layout, optimized based on the size of each passenger and constraints and assignment of seats.

3) Movement of seats or rows of seats automatically, before departure.

As mentioned, the particular case of an aircraft cabin, for example a cabin of 300 seats distributed into three groups of three parallel rows, separated by two aisles, and the layout of this cabin for a given flight are considered here.

In the first phase, size data relative to the passengers that are to travel on this flight are collected by various means. These means include, as mentioned, a direct statement from the passengers, an input of their size during the online reservation or from electronic registration, a camera acquisition in front of a registration station, or the recovery of prerecorded data, for example stored on a discount card.

It is clear that it is not necessary that data relative to all of the passengers be acquired to implement the process that is described. Initially, each passenger is presumed to have the same physiological size characteristics, and in particular leg length. In the absence of contrary data, this information is used for the layout calculation of the cabin.

It is presumed here that the size of the passengers is directly proportional to the length of the front segment of the passengers' legs. This assumption is valid as a first approximation.

In an advantageous variant, the length of the bodily segments is directly acquired, for example, by visual means coupled to software for detection of characteristic points of a human body.

During this same physiological data acquisition phase, the passenger naturally preserves the possibility of imposing a certain number of constraints. He can, for example, express a preference regarding the location of his seat in the cabin (window, aisle, toward the front, toward the rear, etc.), or else the possibility of being seated close to one or several other individuals.

So as to obtain a good optimization of the layout, it is desirable to acquire the size of all of the passengers before they board. However, it is always possible to take into account passengers whose size information is not known. The layout that is obtained cannot be less advantageous than a standard layout, since by default, each passenger is presumed to have average physiological characteristics.

The system is also effective when the number of passengers is less than the conveyor's capacity. In this case, the space taken up by unoccupied seats is reduced.

Once the registration is completed, or when all of the sizes of the passengers are known, the acquired data are transferred to a computer that calculates, in a second phase of the process, an optimized layout.

The algorithm that is used, not at all limiting in this example, is an algorithm of optimization. The latter can be based on a genetic algorithm, for example.

The function that is to be optimized is the spacing between the seat and the knees of each passenger, whereby this spacing should be as large as possible, preferably never negative, for each passenger, and essentially identical for all of the passengers of the same class.

Figure 4:
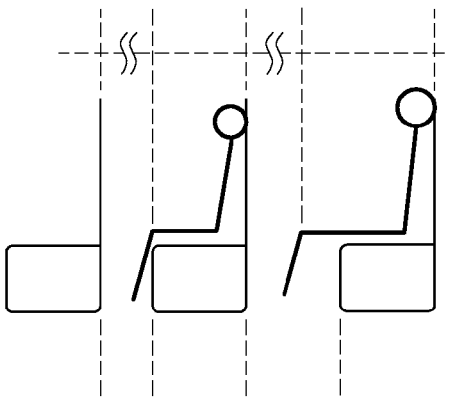
FIG. 4 illustrates the spacing principle of seats according to the measurement characteristics of the passengers.

It is understood that the algorithm will reduce the available space in front of the passengers of the smallest size in order to provide space to the larger passengers (FIG. 4). Simultaneously, it will reduce to the minimum the space in front of the seats that it determines as having to remain unoccupied for releasing space for all of the passengers that are present when the number of passengers is less than the number of seats.

The parameters of the optimization are the positions of the seats. The constraints are: data regarding the size of the passengers, the constraints on the passengers who are traveling together, the desires of the passenger as to his location within the aircraft, and a number of constraints relative to the cabin of the aircraft (in particular maximum allowed movement of the seats, positioning relative to the aeration or emergency system, minimization of the total movement of the seats, load of the aircraft most uniformly distributed on the floor of the cabin, etc.).

Another constraint is linked to the number of seats that form a row. Actually, it is necessary that the "central" seats of one row be accessible to the passengers, i.e., that their longitudinal offsetting does not completely obstruct the space that makes it possible for a passenger to sit down there. It is then conceivable to consider that in a lateral row (located close to the windows) of three seats, a maximum longitudinal offsetting is allowed between the seats of two connecting rows. Likewise, in the case of four central rows, it is possible to decide that these four rows are actually two groups of two rows, whereby the seats of one group of two rows have to be moved simultaneously by the same length. As a variant, it is possible also to decide that a maximum longitudinal offsetting is allowed between two connecting seats that are located on the same side of the median longitudinal line of the cabin.

The objective function is a comfort function, determined by the seat-knee spacing of the passengers. It is possible, for example, to consider that the "comfort" of one passenger is zero when the distance between the seat in front of him and his knees is negative or zero and increases quickly with the available space in front of his knees, reaching a limit beyond a certain space (ten centimeters, for example). The overall comfort function of the layout is then the sum of the comfort functions of all of the passengers.

This comfort function can be calculated by knowing the longitudinal spacing between two seats, the depth of a seat and a model that derives the size of the femur from the size of the passenger. For the first seats of each row, the distance that is taken into account is that which goes from the passenger's knee to a theoretical line that forms the boundary of the cabin.

The optimization is very quick (several minutes), taking into account the simplicity of the objective functions.

As a variant, the calculation of optimization is continued until either an optimized solution has been found or a maximum time of calculation has elapsed. In this second case, the best solution explored is used for the layout. This solution optionally can be the standard layout, whereby all of the seats are distributed at equal intervals.

The algorithm calculates the position of each seat and determines its assignment to a passenger. The seat positions are then transmitted to the aircraft. The assignment of seats is transmitted to the system that manages the boarding. In this nonlimiting example, the seats thus are no longer assigned at registration but upon boarding.

In the time lapse between the end of the registration and the beginning of boarding, the on-board system of automatic movement of seats will reproduce the layout that is calculated by the algorithm.

As a variant, the seats are moved by an installation crew based on a layout plan received by the computer that calculated an optimized layout. In this case, the number of possible positions of the seats on a given rail is usually limited to multiples of a basic interval of several centimeters. The algorithm can then be modified to minimize the number of manipulations of seats having to be implemented by the layout personnel while maximizing the increase in comfort for the passengers.

The configuration that is being considered (an aircraft of approximately 300 seats, of the "charter" type with a single economic class, comprising three rows of independent seats) offers a sufficient degree of freedom to the optimization algorithm so that the layout that is obtained is actually more comfortable for all of the passengers. The objective here is to gain several centimeters (in general 3 to 10 cm), which, over a period of several hours, is reflected by a significant increase in perceived comfort.

It is clear that a possible application of the invention is the long-haul aircraft transport. This type of transport lends itself particularly well to the improvement of passenger comfort in general because of the significant travel time. In addition, the constraints of space requirements and transport capacity with a constant load are particularly important in air transport.

The acquisition of the size or another physical characteristic makes it possible to constitute static data on the transported population. These data can be used to improve the comfort in a general manner or else for commercial or advertising purposes.

The acquisition and the calculation of the layout can also provide significant data on the weight and the centering of the transport vehicle.

Variants Of The Invention

The scope of this invention is not limited to the details of the embodiments above that are considered by way of example, but on the contrary extends to modifications within the scope of one skilled in the art.

The system assigns a seat to each passenger in an optimal way. A similar algorithm can also be implemented to optimize the time that is necessary to the boarding by specifying at what time each passenger is to board.

In another variant, the function that is to be optimized is to take into account both the space between the knees and the seat in front of the passenger, but also an additional factor, linked, for example, to his age, to a difficulty in moving, or any other quantifiable factor for each passenger, for example a number of discount points already acquired by the traveler, the more frequent travelers spontaneously being considered "superior" and thereby assigned more space in front of their seat.

It can also take into account a difference according to the lateral position of the rows of seats: in general, the passengers that prefer to be near a window can agree in exchange to a reduction of their knee-seat space.

It can also take into account the desire of certain individuals to use more space in front of them in exchange for an additional travel payment. These requests can then be taken into account either systematically or as a second priority. In this case, the optimization relates to the fact that all of the passengers use a space that provides them with a certain percentage of their maximum comfort function, each one losing a little bit of his optimum comfort so as to accommodate as well as possible the passengers that pay a supplement, without disadvantaging the other passengers too much.

It is understood that the optimization process as it was just described also applies to the layout of an auditorium, in which the total space is constant, and the spectators are different in size. In this case, the seats should naturally be movable along an axis that makes it possible to increase or to reduce the space between a given seat and the seat or seats located in front of it.

The invention claimed is:

1. Process for determining distribution of seats of a passenger cabin of an aircraft, whereby said cabin comprises at least one row of seats arranged essentially one behind the other along a longitudinal axis, whereby said cabin comprises means for arranging each seat in a position on the ground among a set of possible positions spaced longitudinally at known intervals, comprising:
   a first phase of a computer obtaining characteristics specific to actual passengers of a given trip of the aircraft;
   a second phase of the computer optimizing spacing between seats for the given trip and assigning seats to said passengers according to an overall comfort function of said passengers for a given trip, said function taking into account said obtained characteristics specific to said passengers,
   wherein said second phase for optimization of the space between the seats and for assigning seats to passengers uses an algorithm for optimization under constraints, and wherein said first phase and said second phase are repeated for each of plural subsequent flights so that the characteristics specific to actual passengers of each subsequent given trip of the aircraft determines the optimized spaced between seats for the respective subsequent given trip of the aircraft.

2. Process according to claim 1, wherein the specific characteristics comprise bodily parameters that are linked to the length of the front segments of the passengers' legs.

3. Process according to claim 2, wherein the computer executes, for the given flight and the subsequent flights, the further phases of:
   acquiring bodily parameters of at least some of the passengers before the passengers enter the cabin,
   calculating the optimization of space between the seats and assigning seats to the passengers, optimized based in particular on the bodily parameters of the passengers, and
   moving at least some seats according to the results of this calculation of optimization subsequent to said calculating the optimization of space.

4. Process according to claim 3, wherein the acquisition of bodily parameters of the passengers is implemented by recovery of data stored in a discount card.

5. Process according to claim 4, wherein the algorithm for optimization under constraints is of a genetic algorithm type.

6. Process according to claim 3, wherein the algorithm for optimization under constraints is of a genetic algorithm type.

7. Process according to claim 3, wherein the acquisition of the bodily parameters of the passengers comprises a stage for acquisition of at least one image of the passenger and a stage of implementing an algorithm of automatic visual recognition of bodily segments on these images.

8. Process according to claim 7, wherein the algorithm for optimization under constraints is of a genetic algorithm type.

9. Process according to claim 3,
   wherein the second phase includes the sequential steps of i) the computer, based on the optimization of spacing, calculating the position of each seat, and assigning each seat to each passenger based on the spacing between the seats, and ii) the seat positions being transmitted to the aircraft; and
   the further phase of moving the seats into the calculated positions prior to departure of the given trip.

10. Process according to claim 2, wherein the algorithm for optimization under constraints is of a genetic algorithm type.

11. A non-transitory computer readable medium containing thereon a set of code instructions that, when executed on a computer, cause the computer to implement the process according to claim 2.

12. Process according to claim 1, wherein the algorithm for optimization under constraints is of a genetic algorithm type.

13. Process according to claim 12, wherein the optimization algorithm uses, as a function to be optimized, an overall passenger comfort function, determined in particular by the space left free in front of the passengers' knees.

14. Process according to claim 13, wherein the overall comfort function is the sum of respective comfort functions of all of the passengers, whereby the "comfort" of a passenger is zero when a distance between the seat in front of him and his knees is negative or zero and increases with available space in front of his knees, reaching a limit beyond a preselected space.

15. Process according to claim 1, wherein the specific characteristics comprise a length of the front segments of the actual passengers' legs.

16. Process according to claim 15, wherein,
   based on the length of the front segments of the actual passengers' legs,
   i) in said second phase said optimization of spacing between seats and assigning of seats together results in reduced-spaced seats which reduces available space in front of the passengers of smallest size in order to provide increased-spaced seated which increase space to larger passengers, and
   ii) based on said length of the front segments of the actual passengers' legs, in said second phase, the reduced-space seats are assigned to the smallest size passengers and the increased-spaced seats are assigned to the larger passengers.

17. Process according to claim 15,
   wherein the second phase includes the sequential steps of i) the computer, based on the optimization of spacing, calculating the position of each seat, and assigning each seat to each passenger based on the spacing between the seats, and ii) the seat positions being transmitted to the aircraft; and
   the further phase of moving the seats into the calculated positions prior to departure of the given trip.

18. Process according to claim 1,
   wherein the second phase includes the sequential steps of i) the computer, based on the optimization of spacing, calculating the position of each seat, and assigning each seat to each passenger based on the spacing between the seats, and ii) the seat positions being transmitted to the aircraft; and
   the further phase of moving the seats into the calculated positions prior to departure of the given trip.

19. A non-transitory computer readable medium containing thereon a set of code instructions that, when executed on a computer, cause the computer to implement the process according to claim 1.

20. Device for layout of a passenger cabin, whereby said cabin comprises at least one row of seats arranged essentially one behind the other along a longitudinal axis, and wherein said cabin comprises means for arranging each seat in a position on the ground among a set of possible positions spaced longitudinally at known intervals, said device comprising:
   a computer with
   a set of code instructions for acquiring bodily parameters of at least some of actual passengers before they enter the cabin for a specific trip,
   a set of code instructions for calculating optimization of space between the seats for the specific trip and for assigning seats to passengers, optimized based in particular on the bodily parameters of the passengers, and
   a set of code instructions for automatic longitudinal movement of at least certain seats according to the results of this calculation of optimization utilizing endless screws integrated with slides of the seats and electric motors integrated with the seats.

21. Device according to claim 20, wherein the bodily parameters comprise a length of the front segments of the actual passengers' legs.

* * * * *